No. 753,468. Patented March 1, 1904.

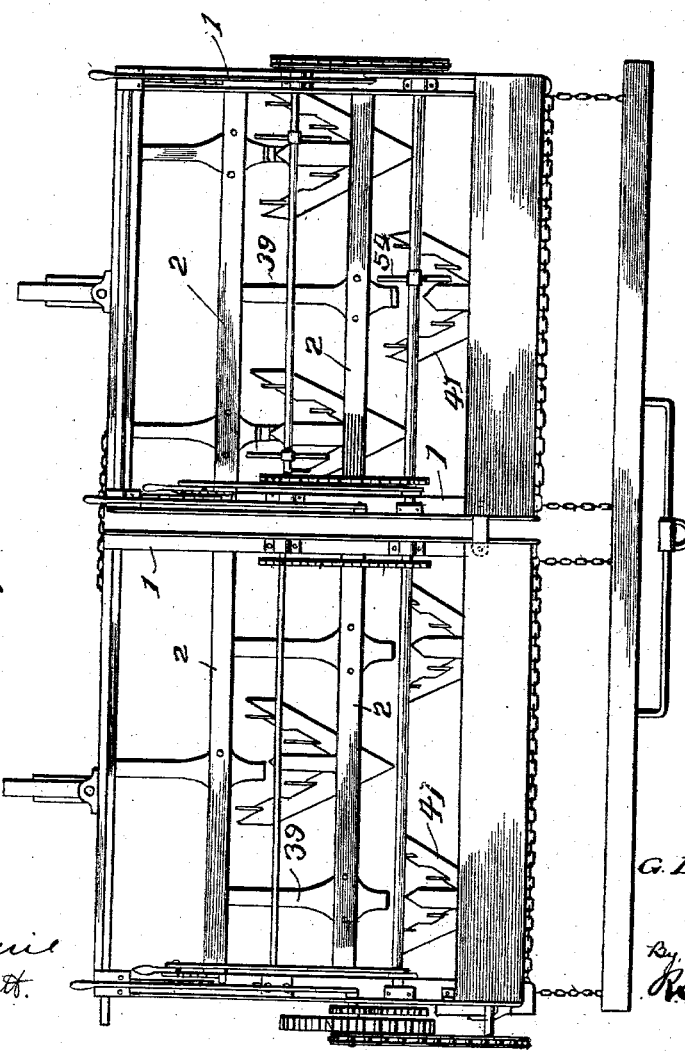

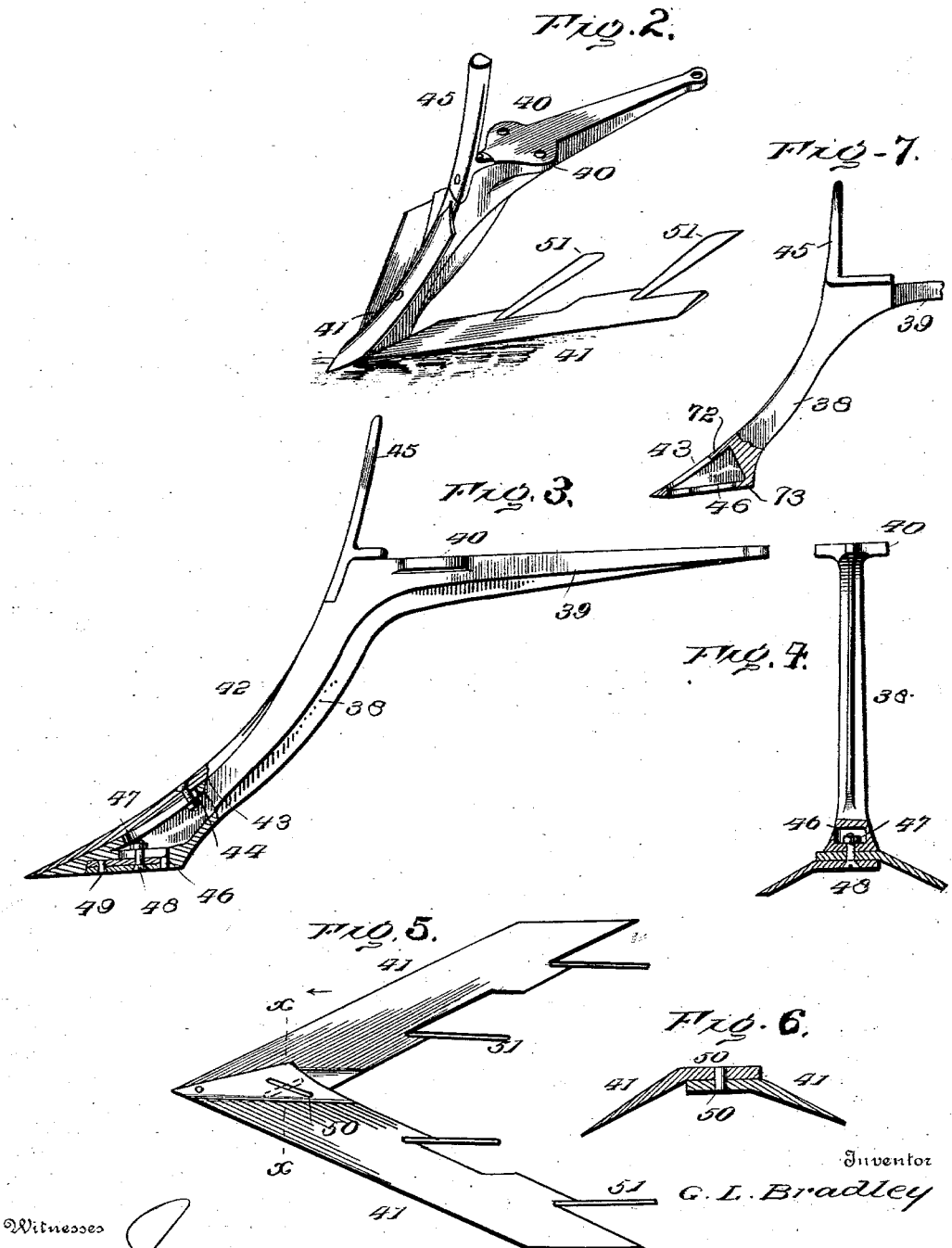

UNITED STATES PATENT OFFICE.

GEORGE L. BRADLEY, OF PATAHA, WASHINGTON.

PLOW.

SPECIFICATION forming part of Letters Patent No. 753,468, dated March 1, 1904.

Application filed December 31, 1902. Serial No. 137,228. (No model.)

*To all whom it may concern:*

Be it known that I, GEORGE L. BRADLEY, a citizen of the United States, residing at Pataha, in the county of Garfield and State of Washington, have invented certain new and useful Improvements in Plows, of which the following is a specification.

This invention relates to agricultural machinery adapted for use in cultivating the soil, the implement being particularly adapted for the cultivation of fallow land, although capable of successful use in tilling any ground.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a top plan view of a number of cultivators embodying the invention coupled in series. Fig. 2 is a perspective view of the standard provided with the sweeps, cultivator-point, and vertical guard. Fig. 3 is a side elevation of the standard with the adjunctive parts in place, the guard, cultivator-point, and lower portion of the standard being in section. Fig. 4 is a rear view of the standard, having the guard and cultivator-point removed and showing the sweeps in transverse section. Fig. 5 is a top plan view of the sweeps. Fig. 6 is a cross-section on the line X X of Fig. 5 looking in the direction of the arrow. Fig. 7 is a detail view of a modified form of standard.

Corresponding and like parts are referred to in the following description and indicated in all the views of the drawings by the same reference characters.

The framework of the implement may be of any construction and form of material best adapted for the purpose, angle-irons being preferred because of the resultant lightness and strength. As shown, the frame is of rectangular construction and comprises side beams 1 and a series of cross-beams 2, the several beams being rigidly connected at their meeting-points, so as to form a substantial structure.

The implement may be provided with any number of earth or cultivating devices, which by preference are disposed longitudinally and laterally, so as to overlap and insure cultivation of the soil within the track or transverse extent of the machine. Each earth-treating device or cultivator comprises a standard, cultivator point or shovel, and sweeps. The standard 38 is of such construction as to curve forwardly and downwardly and is provided at its upper end with a head 39, rearwardly extended for firm attachment of the standard to the frame. The standard is of light and substantial formation and is provided at its upper end with lateral extensions 40 to underlap a beam of the frame and brace the latter and the standard against lateral strain, said extensions being apertured to receive the bolt or fastenings by means of which the standard is attached to the frame. The lower rear portion of the foot of the standard is cut away to receive the front end of the sweeps 41, as shown most clearly in Fig. 3. The cultivator shovel or point 42 is reversible and vertically adjustable, the standard 38 having a vertical slot 43 to receive the bolt 44, by means of which the point or shovel 42 is secured to the standard in the desired position. To facilitate the penetration or movement of the cultivator through the ground, the shovel and the forward edge of the standard are transversely curved. A guard 45 is provided at the upper end of the standard and may be bolted thereto or formed therewith, and this guard extends upward a sufficient distance to prevent weeds and trash from riding over the upper end of the standard and choking the machine. The foot of the standard is provided with a longitudinal slot or seat 46 to receive a nut 47 of a bolt 48, by means of which the sweeps are secured to the standard in an adjusted position.

The sweeps 41 are of similar formation and are provided in pairs and are rearwardly diverged. The sweeps are blades which are arranged with their front ends overlapped and secured to the foot of the standard by means of the bolt 48 and a pivot-fastening 49. A slot 50 is provided near the front rear corner of each blade or sweep and extends lengthwise thereof. Hence the two slots cross when the sweeps are properly arranged, as shown most clearly in Fig. 10. Obviously an adjustment of the bolt 48 either forward or rearward in its slot 46 will cause the sweeps to turn upon the pivot-fastening 49 and their rear ends either to separate or come together, and when the divergence of the sweeps is properly fixed the bolt or fastening 48 is tightened to hold the sweeps in the adjusted position. The sweeps when fixed being rearwardly diverged incline upward and rearward from their front cutting edges, thereby lifting and loosening the soil as the machine is drawn over the field. Each sweep is provided with a series of lifters 51 at their rear edge for the dual purpose of breaking through the surface of the ground and exposing the roots of weeds and other obnoxious growths, so as to effect extermination thereof. The lifters 51 may be in any number and may be a part of the sweeps or bolted or otherwise secured thereto. As shown, the lifters 51 are portions of the sweeps separated by slits and pressed upward. The sweeps are designed to run beneath the surface of the ground to cut the roots of weeds as well as to lighten the soil, and the lifters 51 break through the surface of the ground and carry the weeds upward.

Having thus described the invention, what is claimed as new is—

1. In an agricultural implement, the combination with the standard having a rear extension at its upper end and transverse extensions at the front end of said rear extension, a guard applied to the upper end of the standard, and a clearer for coöperation with the guard to prevent accumulation of trash, substantially as set forth.

2. In combination, a standard having the part between its lower front and rear portion cut away and longitudinally slotted, sweeps having their front ends overlapped and fitted to said cut-away portion of the standard and having slots in the rear portion of the overlapped parts, the slots crossing, means for pivotally connecting the sweeps at their front ends to each other and to the standard, and a fastening operating in the slots of the sweeps and the standard and adjustable to effect a spread of the sweeps at their rear ends more or less, substantially as set forth.

3. In an agricultural implement, and in combination with the standard and plow-point, a coöperating sweep having portions cut from its rear edge and bent upward and rearward to form combined cutters and lifts, substantially as set forth.

4. In an agricultural implement, a standard provided at its upper end with a rearwardly-extended portion for receiving fastenings and having lateral extensions constituting braces, a guard attached to the upper portion of the standard and extended above the plane of said rear extension, a plow-point attached to the lower end of the standard, and sweeps connected to the standard and angularly adjustable and provided at their rear edges with combined cutters and lifts, substantially as set forth.

In testimony whereof I affix my signature in presence of two witnesses.

GEORGE L. BRADLEY. [L. S.]

Witnesses:
G. D. WILSON,
L. B. WILSON.